United States Patent [19]

Mischler et al.

[11] Patent Number: 4,473,971
[45] Date of Patent: Oct. 2, 1984

[54] PROTECTIVE CUTOFF DEVICE FOR A GEAR WHEEL GRINDING MACHINE

[75] Inventors: Eduard Mischler, Regensdorf; Meinrad Donner, Nuolen, both of Switzerland

[73] Assignee: Maag Gear-Wheel & Machine Company Limited, Zurich, Switzerland

[21] Appl. No.: 476,993

[22] Filed: Mar. 21, 1983

[30] Foreign Application Priority Data

Mar. 29, 1982 [CH] Switzerland .................. 1909/82

[51] Int. Cl.³ ............................................. B24B 21/16
[52] U.S. Cl. ............................. 51/56 G; 51/165.9; 51/123 G
[58] Field of Search ............... 51/95 GH, 287, 56 G, 51/52 R, 105 GG, 123 G, 165.71, 165.9

[56] References Cited

U.S. PATENT DOCUMENTS 2,387,166 10/1945 Miller ...................................... 51/287
2,879,630 3/1959 Aeppli ................................... 51/56 G
4,400,916 8/1983 Bloch .................................... 51/287

Primary Examiner—Harold D. Whitehead
Attorney, Agent, or Firm—Werner W. Kleeman

[57] ABSTRACT

The protective cutoff device includes a cutoff control and a cutoff valve system connected to an automatic position control which is present anyway in the gear wheel grinding machine serving for topological flank correction grinding and to an adjusting cylinder, respectively. As a result, the grinding wheel is effectively disengaged from the tooth flank in the process of being ground in the event of electric power failure and/or pressure failure or an undesirable pressure drop or upon the occurrence of any other disturbance or malfunction of the grinding wheel. Therefore one side of the adjusting cylinder is connected to a return line and the grinding wheel carrier or support is displaced against a stationary stop by a force or pressure accumulator.

8 Claims, 1 Drawing Figure

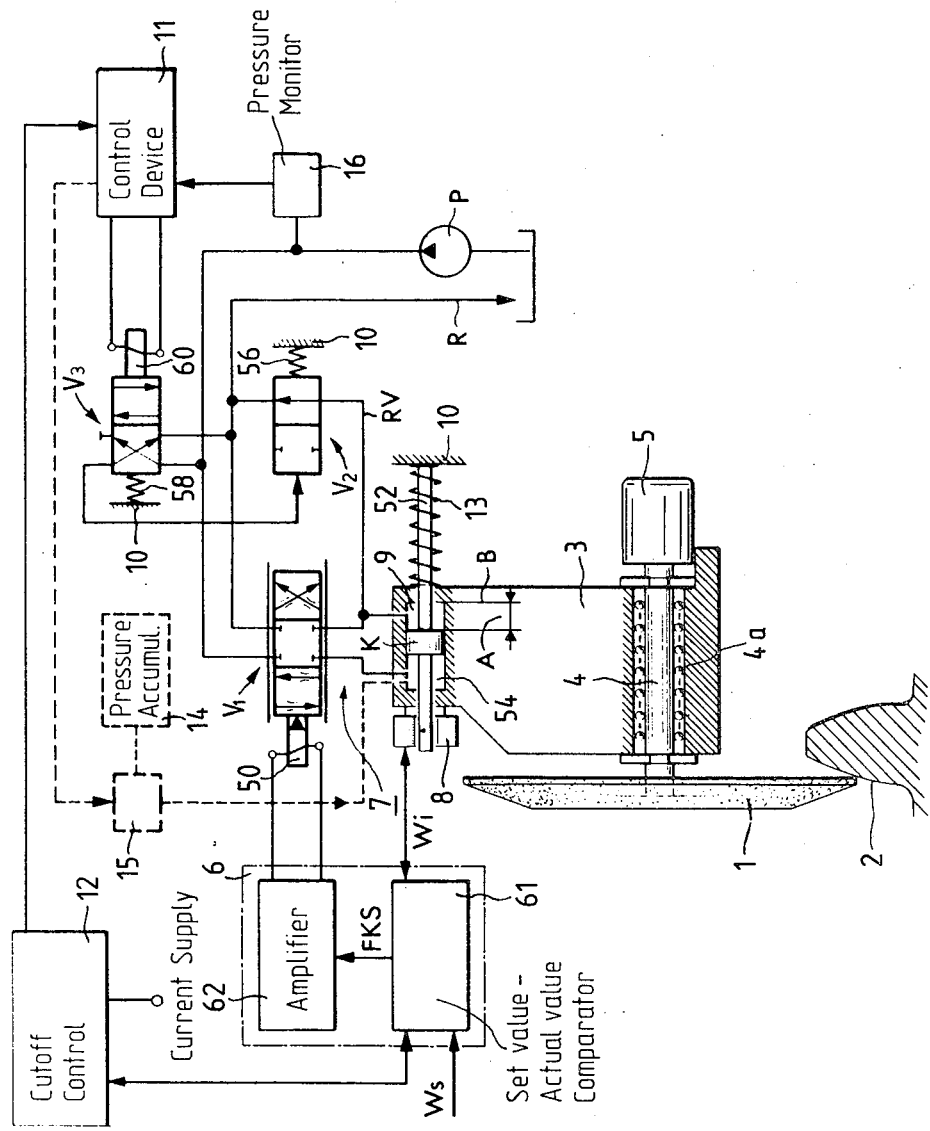

PROTECTIVE CUTOFF DEVICE FOR A GEAR WHEEL GRINDING MACHINE

BACKGROUND OF THE INVENTION

The present invention relates to a new and improved protective cutoff device for a gear wheel grinding machine.

In its more specific aspects the invention relates to a new and improved protective cutoff device for a gear wheel grinding machine which is of the type comprising a grinding wheel displaceable in a direction towards a tooth flank by means of a grinding wheel support or carrier, the position of which is automatically controlled, and further including a superimposed fluid operated, typically hydraulic automatic flank correction control containing a displacement measuring system operating a servo valve by means of a comparator for comparing set or reference values and actual values, the servo valve causing correction displacements of the grinding wheel support or carrier via an adjusting or adjustment cylinder operatively coupled thereto.

A gear wheel grinding machine of the type initially described and for which the protective cutoff device of the invention is intended is known, for example, from the journal "maschine+werkzeug", Coburg, Volume 23, 1979, pages 62–72. In this gear grinding machine the shape of the tooth flank is generated exclusively by kinematic movements. In most cases, however, the tooth flanks are not generated so as to form unchanged involute helical surfaces, rather must be provided with intended involute corrections and corrections of the tooth flank curve, so that the machine is equipped with a corresponding flank correction device. To achieve the desired flank corrections the axial position of the grinding wheel is continuously changed during the procedure and as a function of the generating and advancing or feed movements. The correction oscillations performed by the grinding wheel support or carrier therefor generally amount to some hundredths of a millimeter. The correction movements applied to the grinding wheel carrier originate from a computer. By means of the computer-controlled topologic flank correction device the tooth flank can be generated with a topography which can be freely selected within certain limits. Therefore, the computer processes the received data concerning the instantaneous generating and advance position and determines the feed or displacement value of the grinding wheel by comparison of a set or reference value and an actual value. This feed or displacement valve constitutes the flank correction adjustment for the corresponding coordinates of the tooth flank. For this purpose the computer-controlled topologic correction device includes a data input, a generating displacement pickup, feed or advance displacement pickup, the computer and the servo valve operated thereby. This servo valve acts upon the adjusting or adjustment cylinder in order to impart the correction movements to the grinding wheel carrier as measured by the actual value transmitter. The grinding wheel support or carrier is arranged upon a carriage or slide which is displaceable in correspondence to the desired flank profile or shape, and it is on this carriage that the movements corresponding to the desired flank correction are applied to the grinding wheel carrier by means of the adjusting cylinder.

In such a gear wheel grinding machine problems result in the event of a failure in the electric power or the pressure or when the power or pressure drops below a certain value. In that case the grinding wheel may remain in the position existing at the moment the failure arose and may undesirably grind a hole into the tooth flank during run-down of the grinding wheel to standstill. Alternatively, the grinding wheel support or carrier may assume an undefined position which will complicate the renewed start-up of the machine and the automatic position control of the grinding wheel support or carrier. When the grinding wheel support or carrier is mounted to a cross-beam or traverse and such is located in a position where the servo valve is loaded by a high pressure, then also the servo valve will assume an undefined position in the event of a pressure failure, for example, as a result of an electric power failure, which again has the consequence that the grinding wheel carrier assumes an undefined position.

SUMMARY OF THE INVENTION

Therefore, with the foregoing in mind it is a primary object of the present invention to provide a new and improved construction of a protective cutoff device for a gear wheel grinding machine of the kind initially mentioned which, in the event of failure or drop in the electric power and/or the pressure, ensures that the grinding wheel carrier or support is moved into a defined position.

Another important object of the present invention is directed to the provision of a new and improved construction of a protective cutoff device for a gear wheel grinding machine of the type initially mentioned, which ensures that the grinding wheel is positively removed from the tooth flank when the grinding wheel carrier or support is moved into a defined position due to failure or drop in electric power and/or pressure.

Now in order to implement these and still further objects of the invention, which will become more readily apparent as the description proceeds, the protective cutoff device of the present development is manifested by the features that, a force accumulator is operatively associated with the grinding wheel support or carrier, and a cutoff valve system is provided which triggers a cutoff operation in case of failure or drop in electric power and/or pressure, by opening a return connection between one side of the adjusting or adjustment cylinder and the pressure fluid return, in order to thereby permit the force accumulator to displace the grinding wheel carrier or support in a direction away from the grinding wheel against a stop or stop means. Also, a cutoff control is provided to monitor the flank correction adjustment or adjustment value, in order to initiate the cutoff operation by exerting an electrical action upon the cutoff valve system when a limiting value or threshold of the flank correction adjustment is exceeded.

The force accumulator or accumulator continuously applies a force to the grinding wheel support or carrier which is opposed by a greater hydraulic force during normal operation, so that the grinding wheel carrier is always spaced from the stationary stop by a predetermined distance or amount. In case of malfunction, the need to execute an emergency stop, or failure or drop in the electric power or in the hydraulic pressure, the protective cutoff device reduces the pressure opposing the accumulator sufficiently, so that the accumulator displaces the grinding wheel carrier towards the stationary stop, and thus, removes the grinding wheel from the tooth flank which is in the process of being ground. Additionally, the cutoff control continuously monitors the flank correction adjustment. When the position governed by the set or reference correction value is not reached or when the grinding wheel carrier is displaced too far, then the monitored flank correction adjustment value exceeds a certain preselectable limiting value or threshold. This will result in the cutoff control triggering the cutoff operation, which then will cause the grinding wheel carrier or support to be displaced to the stationary stop, and the grinding wheel is removed from the tooth flank undergoing grinding. The protective cutoff device according to the invention thus effectively ensures that in each case where there arises a malfunction or disturbance, whether such be because of a malfunction in the machine, because of an emergency stop, a failure or drop in the electric power or in the hydraulic pressure, the grinding wheel support or carrier will be positively moved into a defined position and the grinding wheel will be removed from the tooth flank. The problem occurring in the known machine, namely, that the grinding wheel, which is still slowing down or running-out after a power failure, will grind a hole into the tooth flank, is thus safely avoided. Furthermore, the gear wheel grinding machine can be restarted at any time with the grinding wheel support or carrier located at the stop, i.e. in a defined starting position.

According to a further design of the protective cutoff device according to the invention, the cutoff control may operate the control device by a simple switching operation and thereby trigger the cutoff operation. Here, the cutoff valve system may contain an electrically operated or actuatable control device for triggering the cutoff operation in the event of power failure.

In another design of the protective cutoff device according to the invention merely one electrically and one hydraulically operated multi-way or multi-position valve are required in order to open the return connection of the adjusting or adjustment cylinder and to render the accumulator effective in case of a malfunction or disturbance. The multi-way or multi-position valves are commercially available valves which enable retrofitting already existing gear wheel grinding machines in a simple manner with the protective cutoff device at a later point in time.

In a further development of the protective cutoff device according to the invention, the switching operation triggering the cutoff operation may be simply caused by the provision of a pressure monitor which recognizes a predetermined pressure drop. The pressure monitor may be arranged between the hydraulic pressure source and the control device and actuates the control device in the presence of a predetermined pressure drop.

According to another development of the protective cutoff device according to the invention, an adjustable threshold switch can be merely provided to form the cutoff control which initiates the switching operation for triggering the cutoff operation when the flank correction adjustment value is too large, and thus, cannot be realized, because it exceeds a preselectable limiting value or threshold for the flank correction adjustment which is outside the range of values preselectable by adjustment of the threshold switch.

In the design of the protective cutoff device according to the invention simply a spring or a pressure accumulator may be used as the force accumulator for displacing the grinding wheel carrier, if desired, into the defined starting position.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIGURE shows schematically an exemplary embodiment of a protective cutoff device according to the invention for a gear wheel grinding machine.

DETAILED DESCRIPTION OF THE PREFERRED EMBODIMENTS

Describing now the drawings, it is to be understood that only enough of the construction of the protective cutoff device has been shown as needed for those skilled in the art to readily understand the underlying principles and concepts of the present development, while simplifying the showing of the drawing. In such drawing the protective cutoff device is shown in combination with a gear wheel grinding machine operating according to an individual indexing method and which, as shown, is provided with a substantially dish-shaped or dished grinding wheel 1. Equally, while the description to follow, as a matter of convenience and solely for illustrative purposes, refers to a gear wheel grinding machine operating according to such individual indexing method, obviously other types of gear wheel grinding machines can be conveniently equipped with the protective cutoff device as described hereinafter, and therefore, reference to gear wheel grinding machines operating according to such individual indexing process is not to be construed in a limiting sense in any way whatsoever, merely is to be viewed as an exemplary and desirable field of application for the inventive protective cutoff device.

In the individual indexing method a tooth flank 2 is ground, and then the gear wheel is indexed or moved on by one tooth division or pitch, so that the next-following tooth flank can be ground. The grinding wheel 1 is mounted at a grinding wheel carrier or support 3 by means of a spindle 4 and ball bearings $4a$ or the like; the spindle 4 is driven by a suitable drive motor 5. The grinding wheel carrier 3 is mounted to a standard carriage (not shown), the movements of which are controlled by a suitable computer for grinding the desired tooth flanks, as is well known by those skilled in the art.

Additionally, the grinding wheel carrier or support 3 is displaceably mounted upon the mentioned standard carriage and can be displaced by the action of a position control or position regulation circuit 6 which acts upon a hydraulic device which is generally designated in its entirety by reference numeral 7 in the drawing. The automatic position control 6 permits topological corrections to be ground into the tooth flank in combination with the hydraulic device 7. The movements for the correction grinding process are superimposed upon the standard flank grinding movements by having the grinding wheel 1 additionally move towards and away from the tooth flank 2.

The automatic position control or regulator 6 comprises a comparator 61 for comparing set or reference values and actual values and an amplifier 62 which is series connected thereto. The comparator 61 receives a set or reference value $W_s$ governing the flank correction to be ground, for example, from the computer and with which the entire automatic position control 6 may be integrated. Furthermore, the comparator 61 receives an actual value Wi of the displacement or the position of the grinding wheel 1 during the flank correcting operation from an actual value transmitter 8, which is constituted by a conventional displacement measuring system, connected to the grinding wheel carrier or support 3.

The hydraulic device 7 comprises a servo valve V1 which contains an electromagnet 50 on the pilot control or pre-control side thereof and which is operated by the amplifier 62. The servo valve V1 is a high-speed multi-way or multi-position valve which blocks the throughflow between the two not particularly referenced inlet and outlet ports thereof in its central or intermediate position and which provides the desired throughflow connections, which are evident from the drawing, upon displacement to the left or to the right. As shown, the two inlet ports of the servo valve V1 are continuously connected to a suitable hydraulic pressure source P which is symbolically illustrated by a pressure fluid pump and to a pressure fluid return or return line R, respectively.

The grinding wheel carrier or support 3 is provided with an adjusting or adjustment cylinder 9. The piston K thereof is secured to a piston rod 52 projecting from the cylinder chamber 54 of the adjusting or adjustment cylinder 9 to both sides thereof. The piston rod 52 is solidly or fixedly connected at one end thereof to the machine frame 10, which frame carries the standard carriage of grinding wheel carrier 3 and is movable toward and away from the axis of the workpiece, and is inserted with the other end thereof into the actual value transmitter 8. The cylinder chamber 54 of the adjusting or adjustment cylinder 9 is connected on one side or face of the piston K to one outlet port and on the other side or face of such piston K to the other outlet port of the servo valve V1, as shown. When one side or face of the piston K is subjected to pressure, the other side or face thereof is simultaneously connected to the pressure fluid return or return line R, so that the grinding wheel carrier or support 3 and therewith the grinding wheel 1 are correspondingly displaced to the right or to the left. The displacement of the grinding wheel carrier or support 3 is sensed due to its relative displacement with respect to the piston rod 52 of the adjusting or adjustment cylinder 9 and is transmitted as the actual value Wi to the comparator 61. A flank correction adjustment value FKS is formed in the comparator 61 as the difference between the set or reference value Ws and the actual value Wi. The flank correction adjustment value FKS is appropriately amplified by the amplifier 62 and used to electrically pilot control the servo valve V1 by means of the electromagnet 50 thereof. When the grinding wheel 1 is displaced to the left in the drawing a stop position will be realized when the right-hand side B of the adjusting or adjustment cylinder 9 contacts the right-hand side or face of the stationary or fixed piston K.

During a flank correction grinding operation the right-hand side B of the grinding wheel carrier or support 3 is displaced away from the piston K by an amount A which, for example, can correspond to a distance or length of 1 or 0.5 mm. This is the starting position which is maintained by the automatic position control 6 if no flank correction has to be accomplished. During flank correction grinding the grinding wheel carrier or support 3 performs back-and-forth movements with respect to the starting position which correspond to superimposed correction values delivered to the comparator 61 by means of the reference or set value Ws. The correction thus implies an additional displacement of the grinding wheel carrier from the starting position corresponding to the distance A. The servo valve V1 acts in an analogous manner and is continuously displaceable. The more rapidly it is displaced to one side, the greater the increase of the fluid medium throughflow through the same. This has been symbolically illustrated in the drawing by arrows and throttles.

The structure as described hereinbefore constitutes the conventional design of a gear wheel grinding machine including a hydraulic flank correction device. In the description to follow the combination thereof with the protective cutoff device of the invention will be considered in detail.

The protective cutoff device comprises two further multi-way or multi-position valves V2 and V3. The first multi-way valve V2 is hydraulically operable and resettable by means of a spring 56. The second multi-way valve V3 is electrically operable and resettable by means of a spring 58. Furthermore, the protective cutoff device includes an electrically operated control device 11 which is connected to the pilot control or pre-control side (electromagnet 60) of the second multi-way or multi-position valve V3 and a cutoff control 12 which operates or actuates the control device 11.

The first multi-way or multi-position valve V2 is denoted hereinafter as a pressure valve, while the second multi-way or multi-position valve V3 is denoted hereinafter as a switch or switching valve. The pressure valve V2 is arranged in a return connection or line RV connected between the right-hand outlet port of the servo valve V1, and the pressure fluid return or return line R. In the cutoff state thereof, which is illustrated and in which neither electric power nor pressure are present, the return line RV is held open by the pressure valve V2, however, the return line RV is blocked when the pressure valve V2 is displaced to the right by hydraulic pressure acting upon the pilot control side thereof from the source of hydraulic pressure P via the switch valve V3. The two not particularly referenced inlet ports of the switch valve V3 are connected to the source P of hydraulic pressure and to the pressure fluid return or return line R, respectively. As to the two likewise not particularly referenced outlet ports of the switch valve V3 one is blocked while the other is flow connected to the pilot control side of the pressure valve V2. In the cutoff state, as illustrated, the pilot control side of the pressure valve V2 is connected to the pressure fluid return R via the switch valve V3. In the operated or actuated state of the switch valve V3 the same is displaced from the position as illustrated in the drawing to the left, the pilot control or pre-control side of the pressure valve V2 is connected to the source P of hydraulic pressure and the pressure valve V2 is displaced from the position illustrated in the drawing to the right and blocks the return line RV.

The conrol device 11 is actuated to displace the switch valve V3 by means of the cutoff control 12 which simply may be an adjustable threshold switch by means of which a range of values (hysteresis) can be adjusted for the set value-actual value comparison. The cutoff control 12 receives the flank correction adjustment value FKS formed on the basis of the comparison of the set or reference value and the actual value. When the flank correction adjustment value FKS is outside the range of values or when the power supplied to the machine and thereby to the cutoff control 12 fails, the cutoff control 12 will switch-off the control device 11 which simply may be a switch interrupting the power supply to the electromagnet 60 on the pilot control side of the switch valve V3. Due to the spring 58 arranged on the opposite side thereof the switch or switching valve V3 is moved into the position shown in the drawing in which the return line RV is opened and the pressure on the right-hand side of the piston K is reduced.

Finally, the protective cutoff device contains a force accumulator or accumulator, for instance, constituted by a loading spring 13 or a pressure accumulator 14. The loaded spring or spring storage 13 is supported at the machine frame 10 at one end thereof and at the grinding wheel carrier or support 3 at the other end thereof and is so strongly loaded or pre-biased that the grinding wheel carrier or support 3 is urged towards the left, when the return line RV is opened, to such an extent that the right-hand side B of the adjusting or adjustment cylinder 9 engages or contacts the right-hand side or face of the piston K and the grinding wheel 1 is moved away from the tooth flank 2. As long as a sufficiently high hydraulic pressure is present on the right-hand side of the piston K in the adjusting or adjustment cylinder 9 the loaded spring or spring storage 13 cannot displace the grinding wheel carrier or support 3 from the position illustrated towards the left. The pressure accumulator 14 may be a hydraulic pressure accumulator in the illustrated embodiment and is connected to the adjusting or adjustment cylinder 9 on the left-hand side or face of the piston K via a solenoid or electromagnetic valve 15. The pressure supplied thereby will only suffice to displace the grinding wheel carrier or support 3 towards the left, analogous to the aforedescribed action of the loaded spring 13, when the pressure on the right-hand side or face of the piston K is sufficiently reduced due to the opening of the return line RV. When the control device 11 is actuated due to power failure or by the action of the cutoff control 12 the solenoid valve 15 is simultaneously de-energized in order to operatively connect the pressure accumulator 14 to the adjusting or adjustment cylinder 9.

Additionally, the protective cutoff device further contains a pressure monitor 16 which monitors the hydraulic pressure supplid by the source P of hydraulic pressure or pressurized fluid medium and which also switches-off the control device 11 below a predetermined pressure value.

In the following the mode of operation of the protective cutoff device will be described, first during normal operation and then in the presence of various disturbances or malfunctions.

During normal operation the source P of hydraulic pressure or pressurized fluid medium supplies sufficient pressure, and the switch or switching valve V3 is actuated by the control device 11, i.e. it is adjusted to the left of the position illustrated in the drawing. The pilot control or pre-control side of the pressure valve V2 is thus subjected to the hydraulic pressure by means of the switch valve V3 and is adjusted to the right of the position illustrated in the drawing, so that the return line RV is blocked. The right-hand side of the adjusting or adjustment cylinder 9, thereofore, has no flow connection or communication to the pressure fluid return or return line R. The automatic position control 6 is controlled via the set or reference value Ws such that the grinding wheel carrier or support 3 is displaced to the right through the distance A. Additional set or reference values for flank correction then causes the grinding wheel carrier or support 3 to oscillate about the starting position shown in the drawing, only the servo valve V1 which is controlled by the amplifier 62 being effective as described above.

There may occur three main disturbances, namely a drop in hydraulic pressure, non-attainment of the reference removal distance A or electric power failure, upon the occurrence of at least one of which the protective cutoff device becomes effective.

In case of a drop in hydraulic pressure below a predetermined pressure value the pressure valve V2 is adjusted towards the left by means of the action of the return spring 56, and thus, the return line RV is opened. Consequently, the adjusting or adjustment cylinder 9 is depressurized or relieved of pressure at the right-hand side of the piston K. The loaded spring or spring storage 13 or the pressure accumulator or storage 14 are rendered effective in order to displace the grinding wheel carrier or support 3 towards the left to such an extent that it engages the right-hand side or face of the piston K, so that the grinding wheel 1 is displaced away from the tooth flank 2 through the distance A. The pressure drop is detected by the pressure monitor 16 which actuates the control device 11 which, then, switches-off the power supply to the electromagnet 63 of the switch valve V3, so that such valve V3 is returned into the position shown in the drawing by the action of the return spring 58 thereof. In case that the loaded spring or spring storage 13 is replaced by the pressure accumulator 14, then the solenoid valve 15 is opened by the control device 11 in order to displace the grinding wheel carrier or support 3 towards the left through the distance A.

In case that the set or reference value of the displacement distance A cannot be reached, then the difference between the set or reference value Ws and the actual value Wi, i.e. the flank correction adjustment value FKS, is outside of a preselectable tolerance which is recognized by the cutoff control 12. Hence, the switch valve V3 is then switched-off by the control device 11, whereby the switch valve V3 again is adjusted to the position shown in the drawing. There is achieved the same end effect as described above for a drop in hydraulic pressure.

In the event of a failure of the power supply the switch valve V3 is no longer actuated on the pilot control side thereof, so that it automatically assumes the position shown in the drawing and the effect or action described above is again obtained.

In all of the disturbance or malfunction cases described above the grinding wheel carrier or support 3 is displaced into a defined starting position, and the grinding wheel 1 is simultaneously moved off the gear tooth flanks.

According to a practical embodiment, the following commercially available exemplary constructions have been used for the three multi-way or multi-position valves:

servo valve V1: Bosch 0814-SMV2-5/40
pressure valve V2: conventional cutoff valve
switch valve V3: Rexroth 4 WE 6 D30 G24 NZ4

While there are shown and described present preferred embodiments of the invention, it is to be distinctly understood that the invention is not limited thereto, but may be otherwise variously embodied and practiced within the scope of the following claims.

Accordingly, what we claim is:

1. A protective cutoff device for a gear wheel grinding machine containing a grinding machine frame, a grinding wheel movable in a direction towards or away from a tooth flank of a gear wheel by means of a grinding wheel carrier, the position of which is automatically controlled, a hydraulic pressure source and a pressure fluid return, a superimposed hydraulic automatic flank correction control for controlling a flank correction adjustment and including a displacement measuring system, a comparator for comparing set values and actual values of said flank correction adjustment, and a servo valve operated by said comparator and causing corrective displacements of said grinding wheel carrier via an adjusting cylinder having two sides and operatively coupled to said grinding wheel carrier, said protective cutoff device comprising:

stop means for blocking movement of the grinding wheel carrier in a direction away from said tooth flank;

an accumulator operatively associated with said grinding wheel carrier;

a return connection for connecting one of said sides of said adjusting cylinder to said pressure fluid return;

a cutoff valve system cooperating with said return connection;

said cutoff valve system including means for opening said return connection to said pressure fluid return in event of partial or total electric power failure and/or partial or total hydraulic pressure failure, in order to enable said accumulator to displace said grinding wheel carrier including said grinding wheel in a direction away from said tooth flank against said stop means; and a cutoff control means for monitoring the flank correction adjustment and serving to electrically act upon said cutoff valve system in order to trigger a cutoff operation when a limiting value of said flank correction adjustment is exceeded.

2. The protective cutoff device as defined in claim 1, wherein:

said cutoff valve system contains an electrically operable control device for triggering said cutoff operation in the event of electric power failure.

3. The protective cutoff device as defined in claim 2, wherein said cutoff valve system includes:

a first hydraulically operable multi-way valve containing a pilot control side and constituting at least part of said opening means;

said first multi-way valve being arranged in said return connection;

a second multi-way valve electrically operable by means of said control device and constituting a further part of said opening means; and said second multi-way valve being arranged between said hydraulic pressure source and said pilot control side of said first multi-way valve.

4. The protective cutoff device as defined in claim 3, further including:

a pressure monitor arranged between said hydraulic pressure source and said control device for activating the same in the presence of a predetermined pressure drop.

5. The protective cutoff device as defined in claim 2, further including:

a pressure monitor arranged between said hydraulic pressure source and said control device for activating the same in the presence of a predetermined pressure drop.

6. The protective cutoff device as defined in claim 1, wherein:

said cutoff control means monitoring said flank correction adjustment comprises an adjustable threshold switch.

7. The protective cutoff device as defined in claim 1, wherein:

said accumulator comprises a loaded spring arranged between said grinding wheel carrier and said machine frame.

8. The protective cutoff device as defined in claim 1, wherein:

said accumulator comprises a pressure accumulator effective intermediate said grinding wheel carrier and said machine frame.

* * * * *

UNITED STATES PATENT AND TRADEMARK OFFICE
CERTIFICATE OF CORRECTION

PATENT NO. : 4,473,971

DATED : October 2, 1984

INVENTOR(S) : EDUARD MISCHLER et al

It is certified that error appears in the above—identified patent and that said Letters Patent is hereby corrected as shown below:

Column 7, line 13, at the beginning of the line after "by a" please delete "loading" and insert --loaded--

Signed and Sealed this

Fifth Day of March 1985

[SEAL]

Attest:

DONALD J. QUIGG

Attesting Officer     Acting Commissioner of Patents and Trademarks